(12) United States Patent
Baba

(10) Patent No.: US 7,369,281 B2
(45) Date of Patent: May 6, 2008

(54) FACSIMILE DEVICE AND A FACSIMILE DEVICE MONITORING SYSTEM

(75) Inventor: Keizou Baba, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/634,566

(22) Filed: Dec. 5, 2006

(65) Prior Publication Data

US 2007/0081198 A1 Apr. 12, 2007

Related U.S. Application Data

(63) Continuation of application No. 11/076,383, filed on Mar. 9, 2005, now Pat. No. 7,170,646, which is a continuation of application No. 09/448,885, filed on Nov. 24, 1999, now Pat. No. 6,882,450.

(30) Foreign Application Priority Data

Nov. 24, 1998 (JP) ................................. 10-333292
Jul. 5, 1999 (JP) ................................. 11-190752

(51) Int. Cl.
*H04N 1/32* (2006.01)
*H04M 11/00* (2006.01)

(52) U.S. Cl. ........................ 358/442; 358/404; 358/440; 358/444; 379/100.05

(58) Field of Classification Search ................. 358/442, 358/434, 468, 404, 405, 448, 407, 400; 379/100.09, 379/100.01, 93.17
See application file for complete search history.

(56) References Cited

U.S. PATENT DOCUMENTS 4,922,524 A 5/1990 Baba et al.
5,311,327 A 5/1994 Fukushima et al.
5,508,824 A 4/1996 Baba
5,598,533 A 1/1997 Yokota et al.
5,644,404 A 7/1997 Hashimoto et al.
5,778,162 A 7/1998 Morisaki (Continued)

FOREIGN PATENT DOCUMENTS

JP 7-264376 10/1995

(Continued)

OTHER PUBLICATIONS

English language translation of Feb. 8, 2005 Japanese official action in connection with Japanese Patent Application No. 11-190752.

(Continued)

*Primary Examiner*—Aaron W Carter
(74) *Attorney, Agent, or Firm*—Cooper & Dunham, LLP

(57) ABSTRACT

The invention relates to a facsimile device and a facsimile device monitoring system. The result of a transmission can be promptly informed to the user. When an error occurs, the file of the memory transmission can be simply erased, or the address and the transmission property of the memory transmission file can be changed. The facsimile device monitoring system is constructed with the monitoring software and featured in that, when there exists a file of a communication error, the alarm message is displayed on the displaying panel of the personal computer, the (memory transmission) file can be deleted from the personal computer, and the address and/or the transmission property of the (memory transmission) file can be changed.

20 Claims, 9 Drawing Sheets

U.S. PATENT DOCUMENTS

| | | | |
|---|---|---|---|
| 5,812,279 A | 9/1998 | Fukushima et al. | |
| 5,898,824 A | 4/1999 | Kato et al. | |
| 5,936,743 A | 8/1999 | Satoh | |
| 5,970,222 A | 10/1999 | Gusmano et al. | |
| 6,147,775 A | 11/2000 | Mori | |
| 6,151,357 A | 11/2000 | Jawahar et al. | |
| 6,313,926 B1 | 11/2001 | Kumagai et al. | |
| 6,476,935 B1 | 11/2002 | Fujino | |
| 6,882,450 B1 * | 4/2005 | Baba | 358/442 |
| 7,274,480 B2 * | 9/2007 | Enmei | 358/1.15 |

FOREIGN PATENT DOCUMENTS

| | | |
|---|---|---|
| JP | 8-79482 | 3/1996 |
| JP | 92-47324 | 9/1997 |
| JP | 92-47325 | 9/1997 |
| JP | 10-98606 | 4/1998 |
| JP | 10-173847 | 6/1998 |
| JP | 10-200681 | 7/1998 |

OTHER PUBLICATIONS

English language translation of Nov. 21, 2006 Japanese official action in connection with Japanese Patent Application No. 2005-113489.

* cited by examiner

FACSIMILE DEVICE AND A FACSIMILE DEVICE MONITORING SYSTEM

CROSS REFERENCE TO RELATED APPLICATIONS

This application is a Rule 1.53(b) continuation of Ser. No. 11/076,383, filed Mar. 9, 2005 now U.S. Pat. No. 7,170,646, which in turn is a continuation of Ser. No. 09/448,885 filed Nov. 24, 1999, now U.S. Pat. No. 6,882,450, issued Apr. 19, 2005, the entire contents of each of which are incorporated herein by reference.

BACKGROUND OF THE INVENTION

1. Field of the Invention

The present invention relates to a facsimile device and a facsimile device monitoring system and, in particular, to a facsimile device connected to a personal computer device, the personal computer device including a monitoring system for monitoring the status of the facsimile device.

2. Discussion of the Background

A facsimile system capable of confirming the result of facsimile transmission from the image forming (creating) side under the command of an image forming apparatus such as a personal computer, etc. is known. Such a system is disclosed in Japanese Laid-Open Patent Publication Nos. 9-247,324, 9-247,325.

In such a system, image data received from the calling station is stored in an image memory, and thereafter, the stored image data is read out in the order of reception and the read-out data are transmitted to an image outputting apparatus.

Each time the image data for a communication is received from the calling station, the information signifying the result of reception is stored.

The above-mentioned background-art document 9-247,324 discloses a facsimile device capable of outputting the information signifying the respectively stored reception result and other information signifying a transmission result as a communication controlling report, with respect to the transmitted image data.

Furthermore, in the latter background-art document 9-247,325, when the transmission of the image data received from the image forming apparatus to the call-receiving station is completed by the facsimile device, information signifying the communication result is transmitted to the image forming apparatus. The image forming apparatus outputs the information signifying the result of the communication result received from the facsimile device.

Prior to the devices described in the above-mentioned background documents, when the facsimile image data was transmitted from the personal computer to the facsimile device, the facsimile communication result could not be known at the side of the personal computer. In such situation, in order to confirm the communication result, the user (operator) had to walk to the place where the facsimile device was installed. According to the devices described in the above documents, the facsimile device has been improved such that the communication result could be outputted at the personal computer as a communication report.

However, the disclosures in the background documents mentioned above are limited only to the possibility of knowing the communication result on a display of the personal computer. That is, the above technology is not provided with a function of monitoring the facsimile device for the result of a transmission of image data stored at the facsimile device itself, via a personal computer nor a function of correcting an error in the image file from the personal computer when a communication error occurs.

In recent years, the trend has been to connect the facsimile device to the personal computer, to achieve realization of complex functions (multiple function) by unifying the printer functions and the scanner functions. However, even though the personal computer is connected to the facsimile device, the ease of facsimile operations has not improved much.

Regarding background-art facsimile devices, there exists a facsimile device capable of executing a facsimile operation from a personal computer. For example, the facsimile device is capable of registering a one-touch dial number from the personal computer, with the facsimile device capable of displaying the communication result. However, it has not been possible to solve potential problems such as the anxiousness as to the transmission of information from memory of the facsimile device. For example, it is desirable for a user to promptly know the result regarding whether the message has been safely transmitted by the facsimile device, knowing whether the file has been erased due to a transmission error, or of simply deleting the memory transmission file when the facsimile device calls a communication partner at a wrong dialing number, and the like.

Due to the low-cost of facsimile devices, facsimile devices have been frequently employed for personal use. However, if the facsimile device is for personal use and connected to a personal computer, it is wasteful and even uneconomical to print out the report of the result of the transmission of information from memory and/or the error message on a recording sheet.

Heretofore, background art facsimile devices and a facsimile device monitoring system are described. However, according to such background art which is disclosed in the above-mentioned background-art documents, there exists no advantageous functional effect for the facsimile device and the facsimile device monitoring system.

SUMMARY OF THE INVENTION

A facsimile monitoring system comprising a facsimile having an interface which can be connected with a personal computer and a personal computer connected with the facsimile and including monitoring software for monitoring a state of a memory transmission file of said facsimile, wherein, when a memory transmission by the facsimile is completed, a message of a completion thereof is displayed on a displaying panel of the personal computer immediately thereafter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
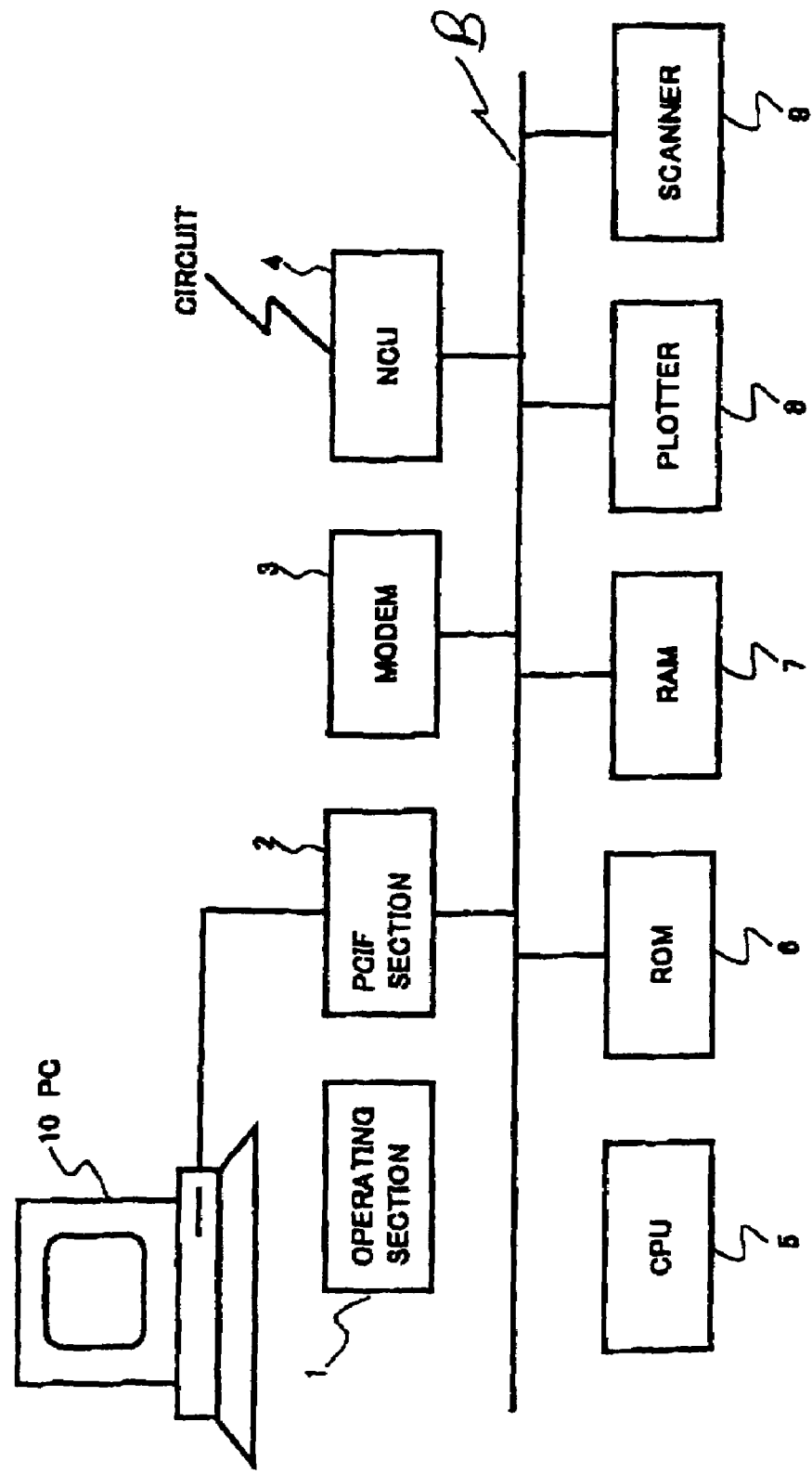
FIG. 1 is a block diagram illustrating an entire facsimile device monitoring system of the first embodiment according to the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts through the views, and more particularly to FIG. 1 thereof, there are illustrated a facsimile device and a facsimile device monitoring system.

In order to solve the aforementioned problems, a first aspect of the present invention promptly informs the user of the result of a transmission of information from memory in the facsimile device, referred to herein as a memory transmission. The facsimile device is provided with a monitoring system including a facsimile having an interface which can be connected with a personal computer and monitoring software provided on a personal computer for monitoring the state of a memory transmission file which includes information indicating the state of transmission of facsimile information from the facsimile. When a transmission of facsimile information from the facsimile is completed, or there exists a file identifying a communication error, this information is promptly provided to the personal computer and a message indicating the result of the communication is displayed on a display panel of the personal computer immediately thereafter providing the user with the result of transmission of the facsimile information.

A second aspect of the present invention, in addition to the above aspect, erases a file of information for which an error has occurred during the transmission process from the facsimile. In the second aspect, the facsimile device monitoring system includes a facsimile having an interface which can be connected with a personal computer and monitoring software provided on the personal computer for monitoring the state of a transmission of facsimile information from memory of the facsimile. When there exists a file for which a transmission or communication error has occurred, it can be deleted from memory of the facsimile by use of the personal computer.

A facsimile device monitoring system of the third aspect of the present invention, in addition to the function of the first aspect, includes a facsimile having an interface which can be connected with a personal computer and monitoring software provided on the personal computer for monitoring the state of a transmission of facsimile information from memory of the facsimile. When there exists a file of information in the facsimile for which a communication error has occurred, the address and/or the transmission property of the file can be changed from the personal computer.

First Embodiment

FIG. 1 is a block diagram illustrating a facsimile device monitoring system according to a first embodiment of the present invention.

The reference numeral 10 represents a personal computer. Monitoring software for monitoring the state of a facsimile employed in the present invention is provided on the personal computer. The reference numeral 1 represents an operating section composed of a key pad for performing facsimile operations, a display for displaying the state of the facsimile, and LEDs, etc.

The reference numeral 2 represents an interface portion for executing the communication between the personal computer and the terminal. For example, an RS232 interface and a P1284 interface can be employed as the interface portion 2. However, the embodiments of the present invention are not limited to these particular types of interfaces.

The reference numeral 3 represents a MODEM, and 4 represents a network (circuit) control unit NCU. The MODEM 3 connects the facsimile device to the network through the NCU 4 and thereby enables the facsimile device to communicate with other facsimile devices as communication partners.

The reference numeral 5 represents a CPU for controlling the terminal and further requires memory including a ROM 6 for storing one or more control programs and a RAM 7 for storing data. Furthermore, a plotter engine 8 and a scanner 9 form portions of the facsimile device.

In the present invention, the control software at the facsimile side enables the communication (receiving/transmitting) between the facsimile device and the PC through the personal computer interface portion 2. Furthermore, the facsimile control software can notify the state of the communication of a file of information (first aspect), erase the file of information from memory (second aspect), and change the address or other data in the file of information (third aspect).

Figure 2:
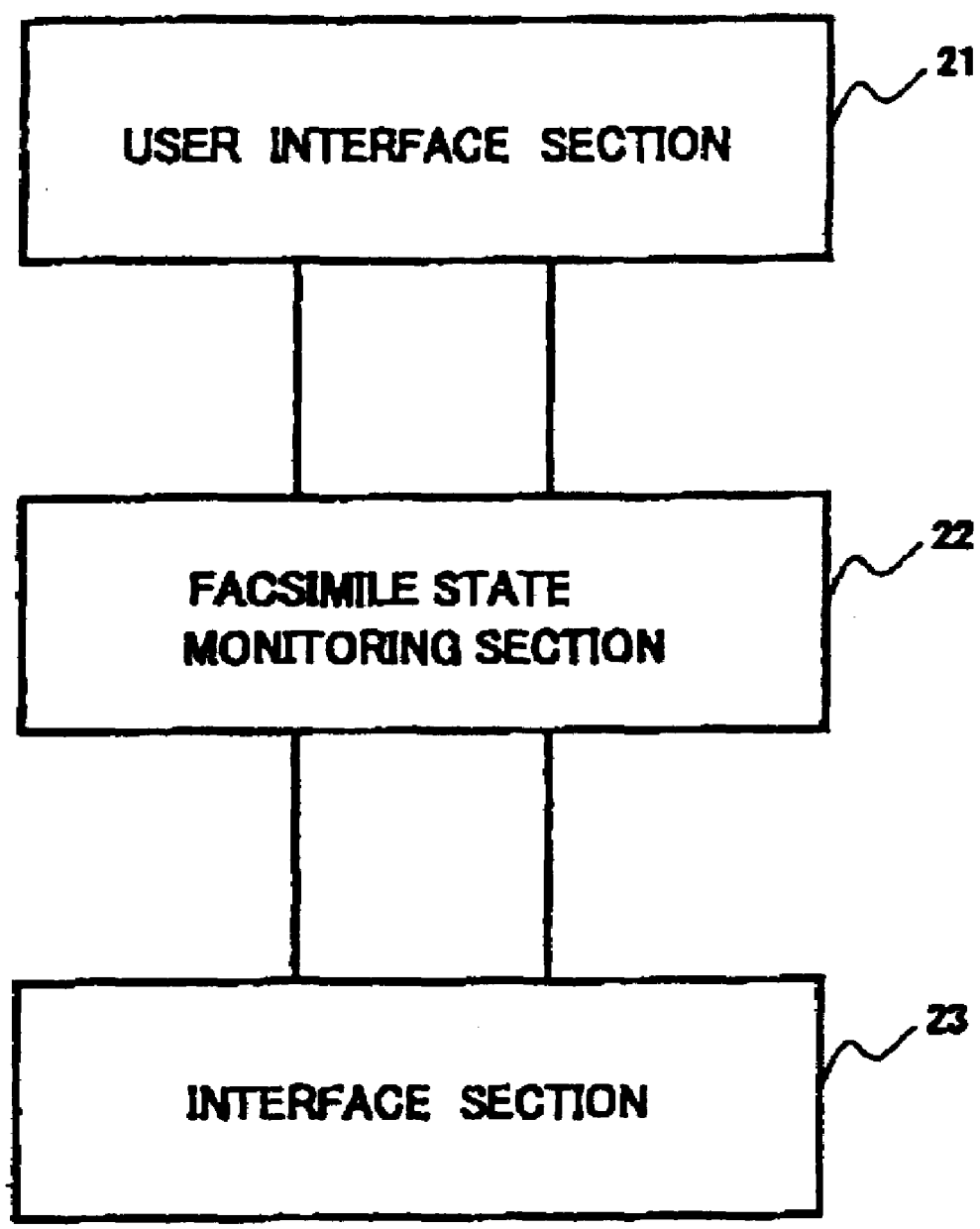
FIG. 2 is a concept diagram illustrating a monitoring software at the side of a personal computer in the facsimile device monitoring system according to the present invention.

Furthermore, the monitoring software at the side of the personal computer 10 is constructed as shown in FIG. 2. In FIG. 2, the reference numeral 21 represents a user interface portion for displaying messages and receiving the user's input. The reference numeral 22 represents an information outputting portion for monitoring the state of the facsimile and outputting the information to the user interface portion 21 and the interface portion 23 as occasion demands. The reference numeral 23 represents an interface portion for controlling the physical interface with the facsimile.

In the first aspect of the present invention, the monitoring portion 22 constantly monitors the state of a memory transmission file which indicates whether facsimile information stored in memory of the facsimile has been transmitted (memory transmission), by receiving information from the control software provided at the side of the facsimile. When the memory transmission is normally completed, or when an error occurs, a message is displayed on the displaying panel of the personal computer by use of the user interface software portion 21.

Examples of messages which can be displayed are as follows:

(1) "The transmission to the Address 11223344 (all pages; 5)—completed."; or
(2) "The transmission to the Address 12345 (all pages; 4)—failed, no response from the communication partner."

In a second aspect of the present invention, messages can be displayed which give the users options regarding how to proceed. In the second aspect of the present invention, as in the case of the first aspect, the facsimile state monitoring software portion 22 running on PC 10 constantly monitors the state of the facsimile. When the memory transmission has failed, the facsimile state monitoring portion 22 outputs messages via user interface section 21, thereby notifying the user of the messages and then waits for further user input.

Examples of messages which can be displayed are: "The transmission to the address 12345 (all pages; 4) has failed because of no response from the communication partner.", "Is this memory transmission to be cancelled?", or "Or, is this memory transmission to be attempted once again?".

When the user input is a request to cancel the transmission, a demand to cancel the memory transmission is sent to the facsimile side. On the other hand, when the user input is a request to retransmit, a request to retransmit the file of information in memory of the facsimile is sent to the facsimile side. In the second aspect, if the messages are shown and reasons for the memory transmission failure are displayed together, such functional information may be useful to the end users.

In a third aspect of the present invention, as in the case of the second aspect, the facsimile state monitoring portion 22 monitors the state of the facsimile. When the memory transmission has failed, the facsimile state monitoring portion outputs the following messages, and thereby notifies the user of the failure and waits for a user input.

For example, the messages which can be displayed are: "The transmission to the address 12345 (all pages; 4) has been failed because of no response from the communication partner.", "Is this memory transmission to be cancelled?", and "Or, is this memory transmission to be practiced once again?".

When the user desires to then change the address, the address is displayed and the user inputs the new address. The new address is then sent from PC 10 to the facsimile. Thereby, the memory transmission can be performed to the new address.

In addition, it is also possible to change the property of the transmission in addition to the address. For instance, in a facsimile device having the G3/G4 transmission modes, a mode already set as G4 mode can be changed to the G3 mode. In the facsimile device having two circuits (networks), it is possible to designate the circuit employed for the transmission.

Second Embodiment

Figure 3:
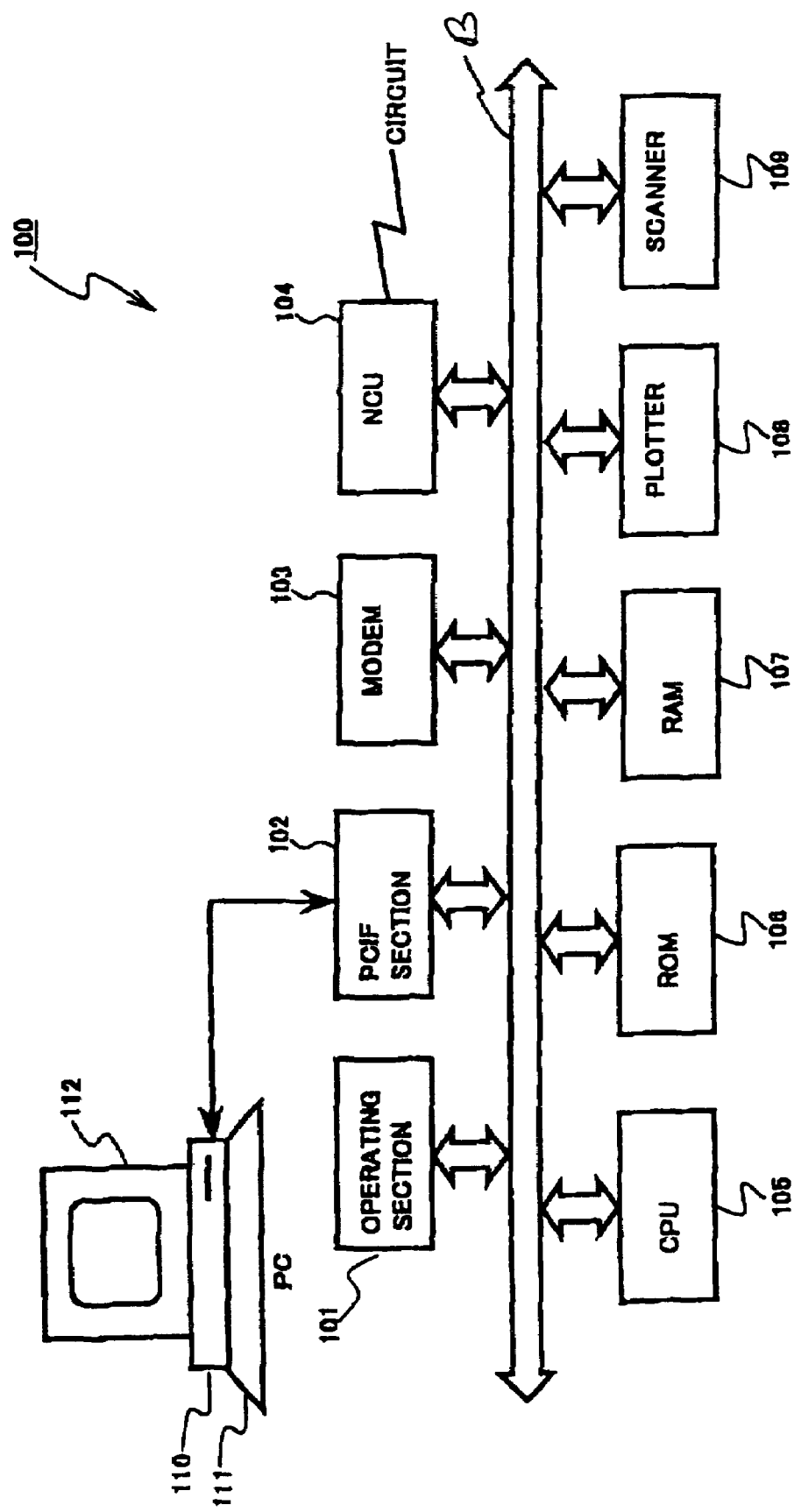
FIG. 3 is a block diagram further illustrating an entire facsimile device monitoring system of the second embodiment according to the present invention.
Figure 4:
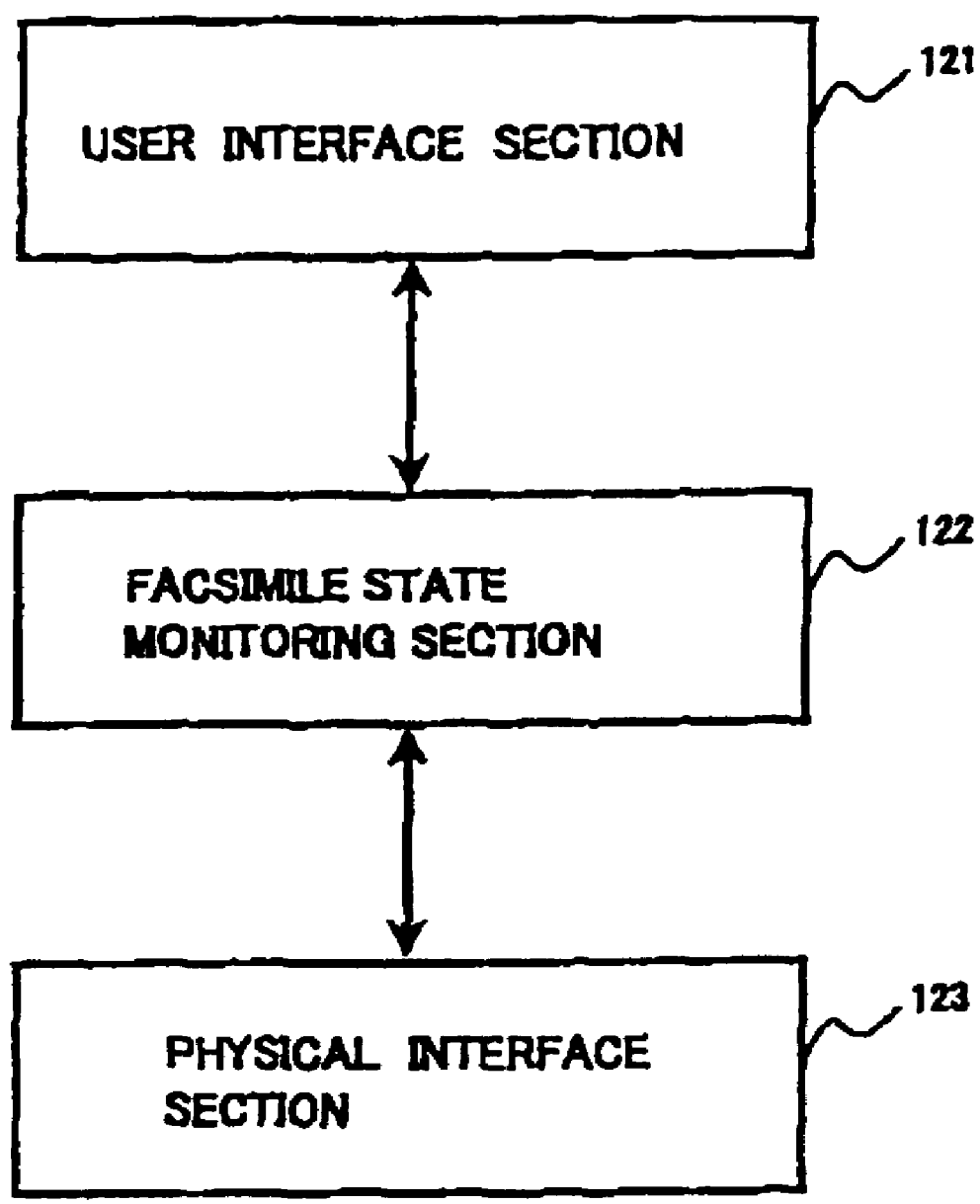
FIG. 4 is a concept diagram illustrating a monitoring software at the side of a personal computer in the facsimile device monitoring system according to the present invention.

The second embodiment of the present invention is described hereinafter, referring to the accompanying drawings. FIGS. 3 and 4 are explanatory diagrams illustrating a second embodiment of the facsimile device monitoring system.

In FIG. 3, the reference numeral 100 represents a facsimile device, and 110 a personal computer (PC). In such facsimile system, the PC 110 is constructed such that the locally connected facsimile device 100 can be utilized as a multiple function type facsimile device.

In the facsimile device 100, a central processing unit (CPU) 105 controls the respective parts of the facsimile device 100 in accordance with control program software and executes various sorts of processing according to the present invention. A read only memory (ROM) 106 stores control program software. A random access memory (RAM) 107 stores various sorts of information concerning the driving condition and control data, etc. of the respective parts of the facsimile device and stores the necessary data required for the operation of the facsimile device such as the image data to be memory-communicated (transmitted and received). An operation part 101 is provided with various sorts of operation keys such as a ten-key keypad and function keys for performing the operation of inputting the operator's settings and ordering, etc., together with a displaying unit such as liquid-crystal display (LCD), light emitting diode (LED), etc. for displaying various sorts of information such as driving condition, state of the facsimile device, or input information. A network control unit (NCU) 104 executes a predetermined circuit control at the time of connecting to a telephone circuit for transmitting and receiving the calling (message) and performing the connection or cutting-off of the telephone circuit. A modulator/demodulator (MODEM) 103 modulates and demodulates the image data and provides the various sorts of procedure signals for transmitting and receiving the image data through the NCU 104. A scanner 109 reads out the image data from a document to be transmitted. A plotter 108 records the image on the recording medium (recording paper) on the basis of the read-out/received image data and outputs the image. Each of the above portions of fax device 100 are connected via bus B, as shown. The structure as mentioned above functions as the facsimile device.

Such facsimile device 100 is constructed such that a PC interface (PCIF) 102, which enables the PC 110 to connect to the facsimile device 100 so as to transmit and receive data therebetween, is connected to the bus B. PCIF 102 can be an interface such as RS 232 and P 1284, etc, for example. Image data transmitted and received by facsimile 100 can be relayed to PC 110 in response to a facsimile communication request by the PC 110. In addition, the facsimile device 100 is also usable by PC 100 as a scanner device and a printer device.

Furthermore, by performing the appropriate inputting operation from the operation part 101, the facsimile device 100 can also cancel the memory transmission and delete (erase) the image data stored in RAM 107, and can change the transmission property such as the address for the memory transmission, the selection of the G3/G4 mode, and the used telephone circuit, etc.

In addition, it is possible to set the requirement/non-requirement of recording and outputting a report indicating the results of facsimile communication, by use of the plotter 108.

The PC 110 is a generally-used personal computer constructed with CPU, memories (ROM, RAM, HDD, etc.), I/O circuit, and IF circuit, etc. The user performs an inputting operation for inputting commands or data via a keyboard 111 or a mouse (not shown). The CPU uses the memory as a work area and executes software stored in the hard disc device (HDD), and causes the display (displaying medium) 112 to display various sorts of information. In such way, document drafting and facsimile communication can be performed by use of the general personal computer 112 as mentioned above.

As shown in FIG. 4, the PC 110 is constructed with a physical interface software section 123 forming a physical interface for transmitting and receiving data between the facsimile device 100 and the PC 110. A user interface software section 121 displays messages on a display 112 and receives (accepts) the input indication or instruction from the user's keyboard 111, etc. Facsimile state monitoring software section 122 monitors the state of the facsimile device 100 and delivers the data to the user interface section 121 and the physical interface section 123 as necessary.

The monitoring software for monitoring the state of the facsimile device 100 is thus stored in the PC 110. In such structure, the state of the facsimile device 100 can be confirmed and operated from a remote location.

The facsimile device 100 can exchange the image data and various sorts of information with the PC 110 through the physical interface section 123 of the PC 110, in accordance with a control program software stored in the ROM 106 and executed by CPU 105. The facsimile device 100 can also send back the state of the memory communication (e.g., transmission results) to the PC 110 and inform the PC of the state in accordance with a request or requirement from the PC 110. Furthermore, it is also possible to erase a file of image information from the facsimile memory, or change the address to which the image information is to be transmitted, from the PC 110.

Basically, the facsimile state monitoring section 122 constantly (repeatedly) makes an inquiry of the facsimile communication state. The PC 110 receives a response from facsimile device 100 and thus monitors the state of transmission of the image file to be transmitted. When the transmission is normally completed or when an error occurs, this information is communicated to PC 110 and the user interface section 121 outputs a message indicating completion of the memory transmission or a message indicating the occurrence of an error. The messages are displayed on the display 112 of PC 110.

For example, monitoring section 122 can provide a completion message such as "The transmission of total 5 pages to the address 11223344 has been completed.", or an alarm message including the reason of the failure such as "The transmission of total 4 pages to the address 12345 has failed because of no response from the communication partner" which can be displayed on display 112 via user interface section 121.

Consequently, even when a manuscript document is scanned and requested to be transmitted from facsimile device 100, and the facsimile device 100 is directly operated, the result of transmission can be promptly confirmed even at the a remote location (PC 110).

Furthermore, when the memory transmission has failed, for example, the PC 110 causes the alarm messages; "The transmission of total 4 pages has failed because of no response from the communication partner. Is the memory transmission cancelled? Or is the memory transmission to be performed once again?" to be displayed on the display 112, and thereby, the PC 110 informs the user of those messages, urging the user for an input regarding how to proceed.

If the indication inputted by the user is a request to cancel transmission of the image file, the PC 110 sends out a request to erase the image file which previously failed in the transmission, to the side of the facsimile device 100. On the other hand, if the indication inputted by the user is a request for the retransmission of the image file, the PC 110 sends out a request to continue the control of retransmitting the file which previously failed in the transmission, to the facsimile device 100. In such way, it is possible to request how the facsimile device 100 should treat the file held by the facsimile device 100. Consequently, for example, when a manuscript document is to be transmitted from the facsimile, it is possible to request the deletion or transmission of the file of the manuscript document from a remote location.

Furthermore, when the transmission has failed, the PC 110 informs the user of the alarm message and the process message. That is, the PC 110 displays a message on the display 112 to inform the user of the alarm, for instance, the message "The transmission (all 4 pages) to the address 12345 has failed because of no response from the communication partner. Do you want to change the memory transmission?" together with messages enhancing the processing of the transmission file.

If a response inputted by the user is to change the contents of the image transmission file, the contents of the transmission properties of the file such as the facsimile number and the transmission mode G3/G4 of the transmission file which failed in the memory transmission are displayed and can then be edited at the PC 110.

The transmission properties such as the designation of the facsimile number (address) and the transmission mode G3/G4 and the designation of the circuit to be employed for the transmission, are sent out to the facsimile device 100 from PC 110. In such way, it is possible to request a change of the treatment of the image transmission file held by the facsimile device 100. Consequently, even though a manuscript document is the one to be transmitted by the facsimile device 100, it is possible to continue the memory transmission by changing the contents of the request to the facsimile device 100 from PC 110.

Moreover, in the second embodiment of the present invention, the description relates to the treatment of an image transmission file which has failed during a memory transmission. However, even if no error occurs, a state informing request can be sent to the facsimile device 100 from the PC 110, requesting the facsimile device 100 to return information indicating the total files not yet transmitted, which can then be displayed and outputted at PC 110. Furthermore, it is possible to designate from PC 110 one of the files not yet transmitted and perform operations of erasing and changing the address of the designated file.

In such embodiment of the invention, even though the transmission is requested directly at the facsimile device 100, it is possible to display on the display 112 of the PC 110 and output therefrom the communication result including a message such as a completion message or an error message of the memory transmission. In such way, the communication result can be confirmed or monitored.

Consequently, it is not necessary to go to the place where the facsimile device 100 is installed and operate the facsimile device 100 itself. Furthermore, the recording or printing of the communication result report output at the side of the facsimile device 100 can be stopped automatically, and thereby waistful usage of the recording paper can be avoided and all of the memory transmission results can still be confirmed.

Furthermore, the contents of a request such as the address which is set into the facsimile device 100 from the PC 110 can be changed and the file to be transmitted can be erased. For instance, when the facsimile number of the communication partner is wrongly inputted, or when the circumstances or conditions of the communication partner change, the transmission file can be deleted. Accordingly it is possible to avoid the execution of repeated memory transmission (retransmitting). In addition, the transmission property of the file, such as the address or the transmission mode G3/G4, can also be changed.

Consequently, it is possible to omit having to go to the place where the facsimile device 100 is installed and newly perform again the memory transmission operation.

Third Embodiment

Next, a third embodiment of the present invention is described hereinafter, referring to the accompanying drawings. FIG. 5 through 9 are explanatory diagrams illustrating the featured portion of the third embodiment of the facsimile device monitoring system relating to the present invention.

Figure 5:
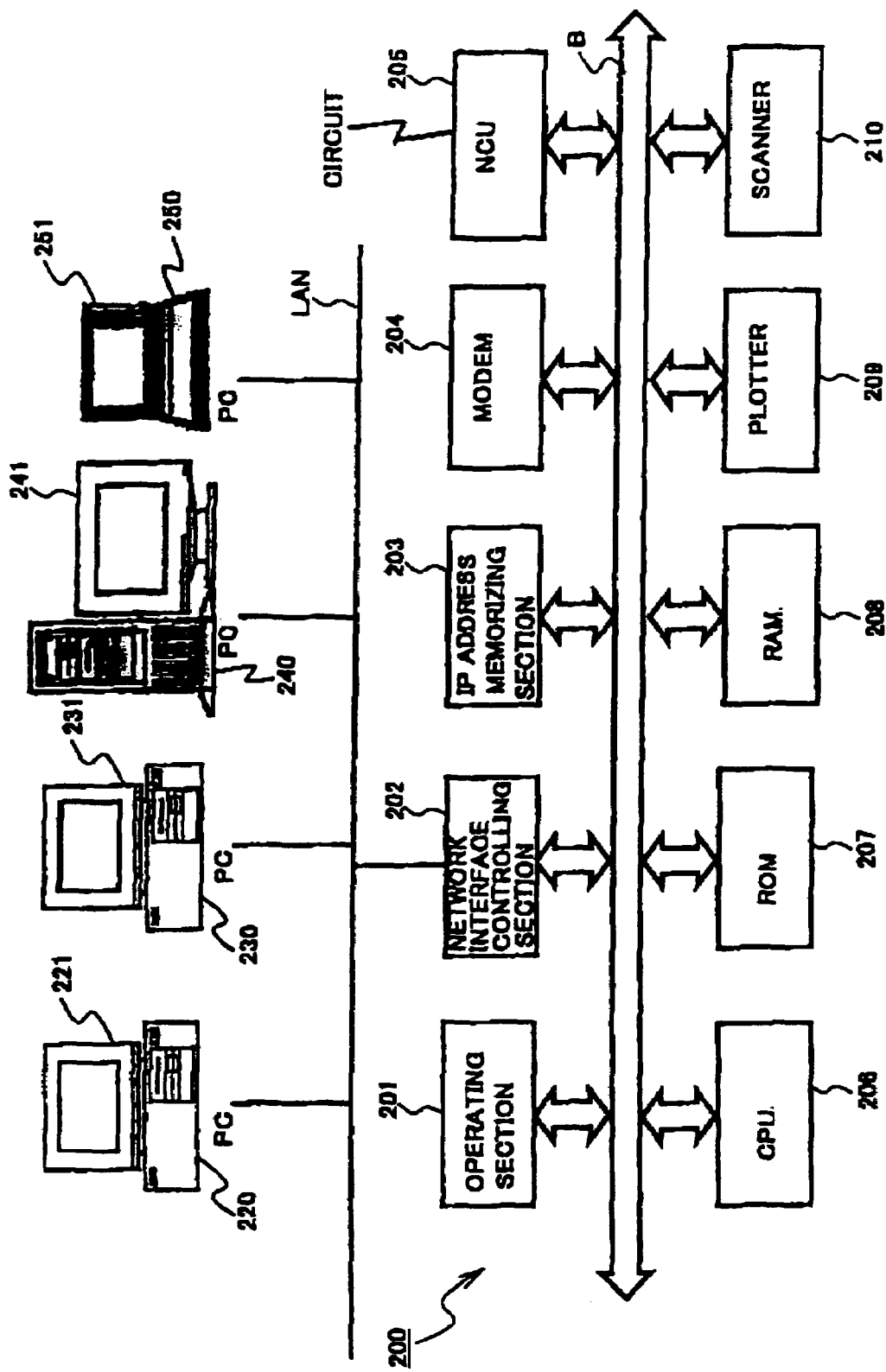
FIG. 5 is a block diagram illustrating the network system composed of plural personal computers and other elements of the second embodiment respectively connected with network according to the present invention.

In FIG. 5, a facsimile device 200 and a PC 220 are connected, together with other PCS; 230, 240, and 250, to the cable for constructing a local area network (LAN). A CPU 206, a ROM 207, an operating section 201, an NCU 205, a MODEM 204, a scanner 210, and a plotter 209, all constructing the facsimile device 200, are connected, together with a network interface controlling section 202 and an IP address storing section 203, to a bus B. For instance, the network interface control section 202, etc. is connected to the LAN with TCP/IP, and thereby the facsimile device (monitoring) system as mentioned above is constructed such that facsimile device 200 can be commonly used as the facsimile device, the scanner device, and the printer device by each of the PCs 220, 230, 240, and 250.

Figure 6:
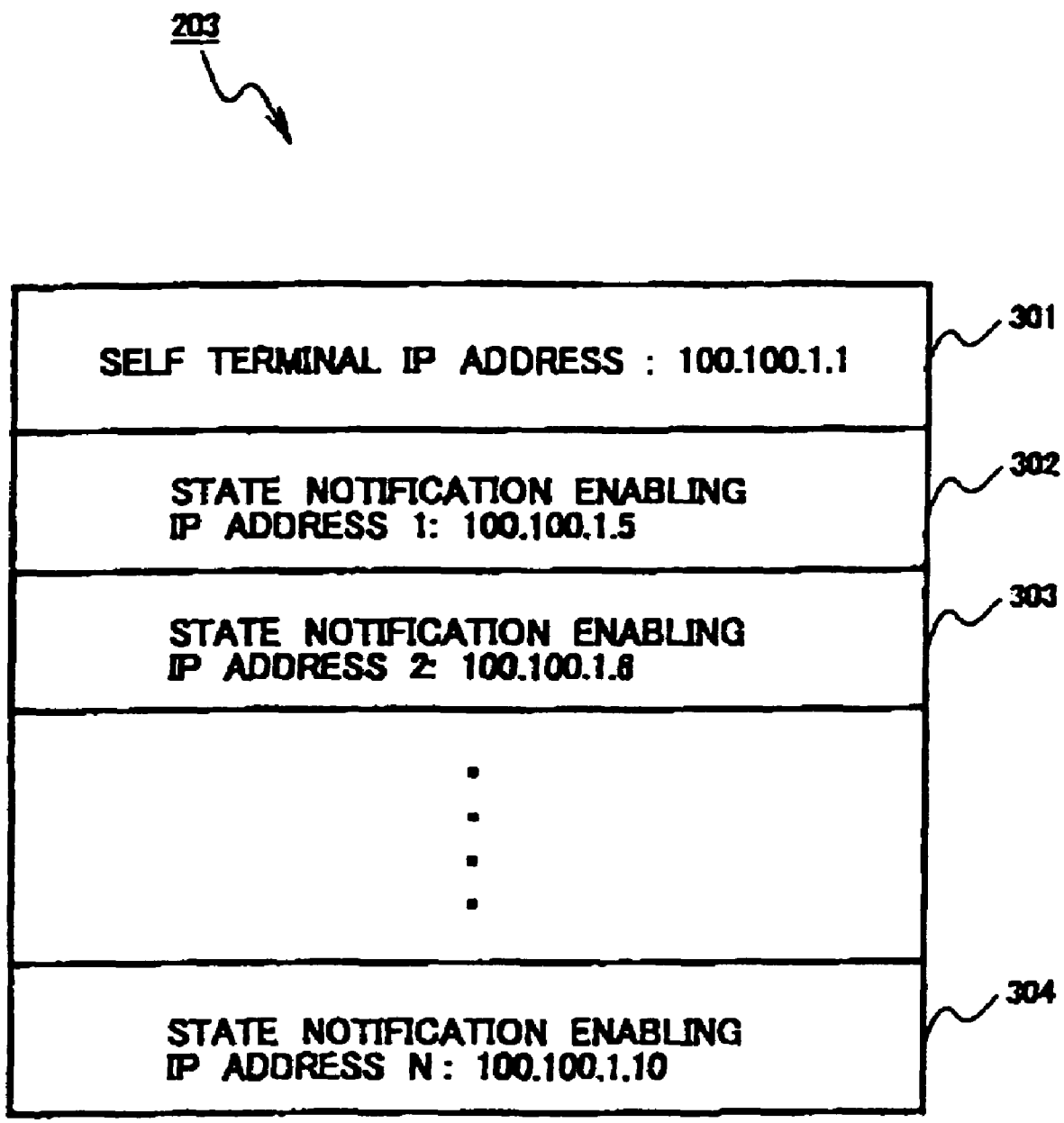
FIG. 6 is an explanatory diagram illustrating the detailed structure of the IP address memorizing section.

In the facsimile device 200, as shown in FIG. 6, an IP address storing section 203 stores the IP address 30 on the network of facsimile device 200 together with the respective IP addresses 1, 2, - - - , N of the communication partners, PCs 220, 230, 240 and 250 (302-304). Additional information may also be stored in storing section 203. For example, information can be stored indicating for each of the respective IP addresses of the PCs 220, 230, 240, and 250, the communication partner to be notified of the state (communication result) of the facsimile device or information indicating the communication partner or partners which are allowed to change the contents of the memory in facsimile 200. In FIG. 6, the IP address storing section 203 includes a self terminal IP address storing section 301, a state notification enabling IP address 1 storing section 302, a state notification enabling IP address 2 storing section 303, - - - , and a state notification enabling IP address N storing section 304.

Figure 7:
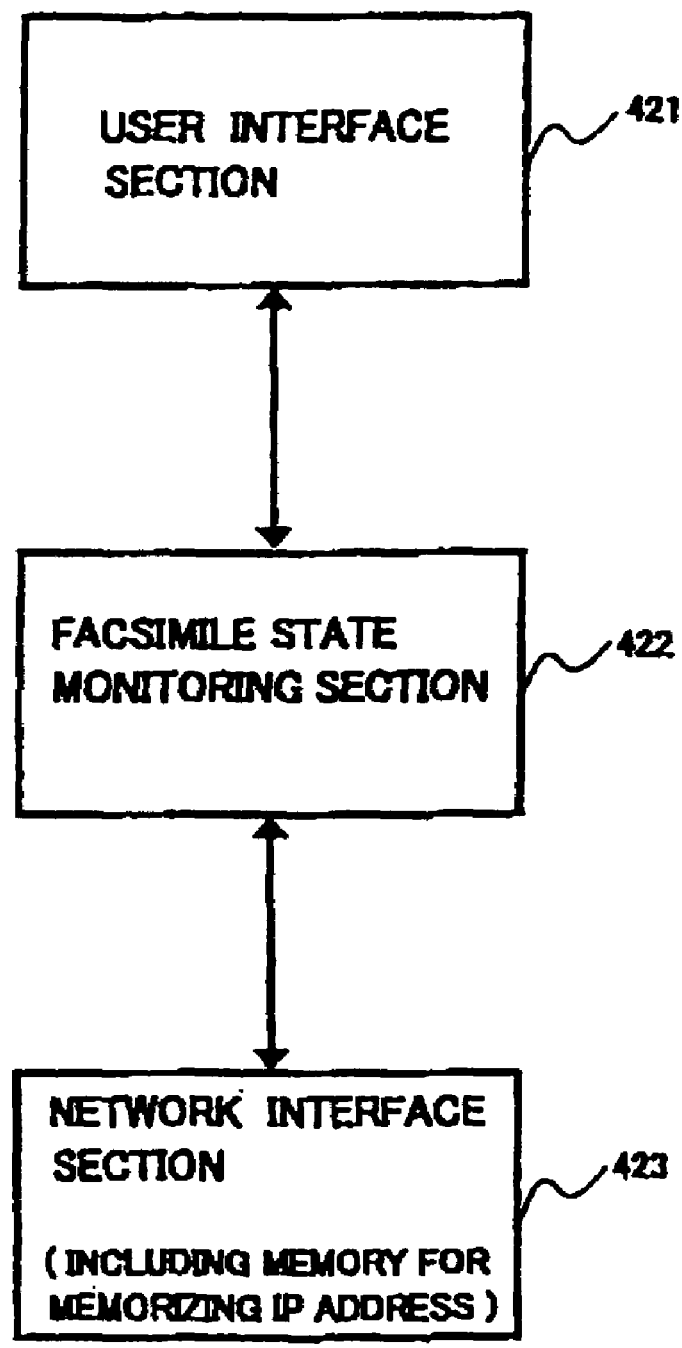
FIG. 7 is a concept diagram illustrating a monitoring software at the side of a personal computer in the facsimile device monitoring system of the second embodiment according to the present invention.

As shown in FIG. 7, each of the PCs 220, 230, 240, and 250 respectively include a user interface section 421, a facsimile state monitoring section 422, and a network interface section 423 forming a physical interface on the network and storing at least the IP address of the facsimile device 200 in memory and for transmitting and receiving data between the respective PCs and the facsimile device such that the state of the facsimile device 200 can be confirmed and operated at a remote place through the LAN. In such structure, the monitoring software for performing the operation of monitoring is stored in the respective PCs.

Furthermore, in the facsimile device 200, the CPU 206 can exchange image data and various other information with the PCs 220, 230, 240, and 250 through the network interface section 423 of the PCs in accordance with a control program software stored in the ROM 207. In addition, in the facsimile device 200, the state of the memory communication (e.g., transmission results) can be informed back to the PCs in accordance with a request from the PCs 220, 230, 240, and 250.

Figure 8:
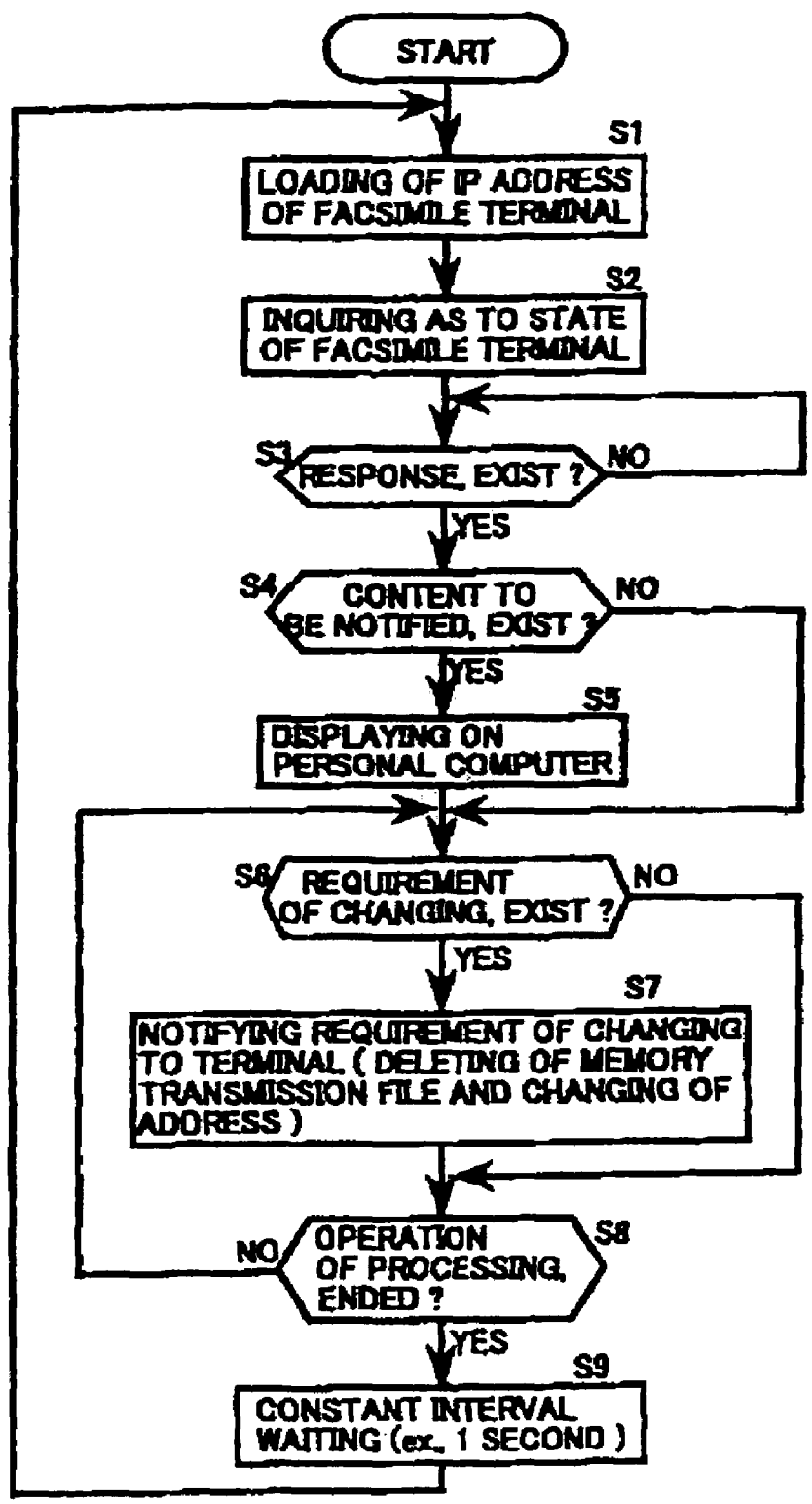
FIG. 8 is a flowchart illustrating the operation of the permanently-stationed software at the side of the personal computer.

The processing operation performed by of the PCs is illustrated by the flowchart in FIG. 8. When operation of the monitoring software is initiated (started), the IP address of the facsimile device 200 is read out, at first, by the network interface section 423 (Step S1), and then an inquiry requesting the state notification of the facsimile is made to the facsimile device 200 (Step S2). After the response thereto is confirmed (No, Step S3) when there exists no content to be notified, (that is, no processes have been executed at all since the previous inquiry) (No, Step S4), the process proceeds to Step S6. If no request from the user exists for changing the content of the memory transmission stored in the facsimile device 200 (No, Step S6), the process is ended (Step S8). After a set time (e.g., 1 second) elapses (Steps S9), the process returns to step S1, and the state of the facsimile device 200 continues to be monitored.

On the other hand, when the result of the request of the notification of the state of the facsimile device 200, indicates that a transmission has occurred (Yes, Step S4), the result of transmission is transmitted to the PC and displayed (Step S5). The user interface section 421 of the PC then performs the operations as mentioned below.

For instance, when there exists a response from the facsimile device 200 notifying the fact that memory transmission of the image file has been normally completed, the message "The transmission (total, 5 pages) to the address 11223344 is completed." is displayed on the display 221, as a completion message of the memory transmission.

On the other hand, when there exists a response notifying the fact that an error has occurred during the memory transmission of the image file, the alarm messages "The transmission (total, 4 pages) to the address 12345 has failed because of no response from the communication partner. Do you want to cancel the memory transmission, or do you want to perform the memory transmission once again? Do you want to change the address, etc.?" and other messages for enhancing the treatment of the transmission file can be displayed on the display 221 (step S5).

Next, if during a preset time period, there exists a request requesting the contents of the memory transmission file stored in the facsimile device 200 to be changed, etc. (Yes, Step S6), the user interface section 421 performs the operations as mentioned below.

For instance, in the case of cancelling an image file which has an error occurring therein, and for which transmission failed which was informed to the PC at the time of processing the above inquiry (Steps S4, S5), a request for erasing the memory transmission file can be sent out to the facsimile device 200 from the PC. In the alternative, in the case of retransmitting the memory transmission file, a request to continue (transmit again) the image file which failed in the immediately-previous memory transmission, is sent out to the facsimile device 200. On the other hand, when the input indication is to change the content of the image transmission file, an address editing image is displayed on the PC display together with the facsimile number (address) and/or the transmission property G3/G4 of the transmission file which failed in the immediately-previous memory transmission. Then, the designation of the facsimile number, the transmission mode of G3/G4 and the transmission property such as the designation of the circuit employed when two circuits are available, are sent out to the facsimile device 200. A message requesting that the file which is stored in the facsimile device 200 be changed is sent (step S7). Then, when there exists an input of a END key which can be displayed on display 221, for example (Yes, step S8), the process returns to step S1 after a preset time elapses (step S9), and then the state of the facsimile device 200 continues to be monitored. Thereafter the above operation is continued in the similar way.

Figure 9:
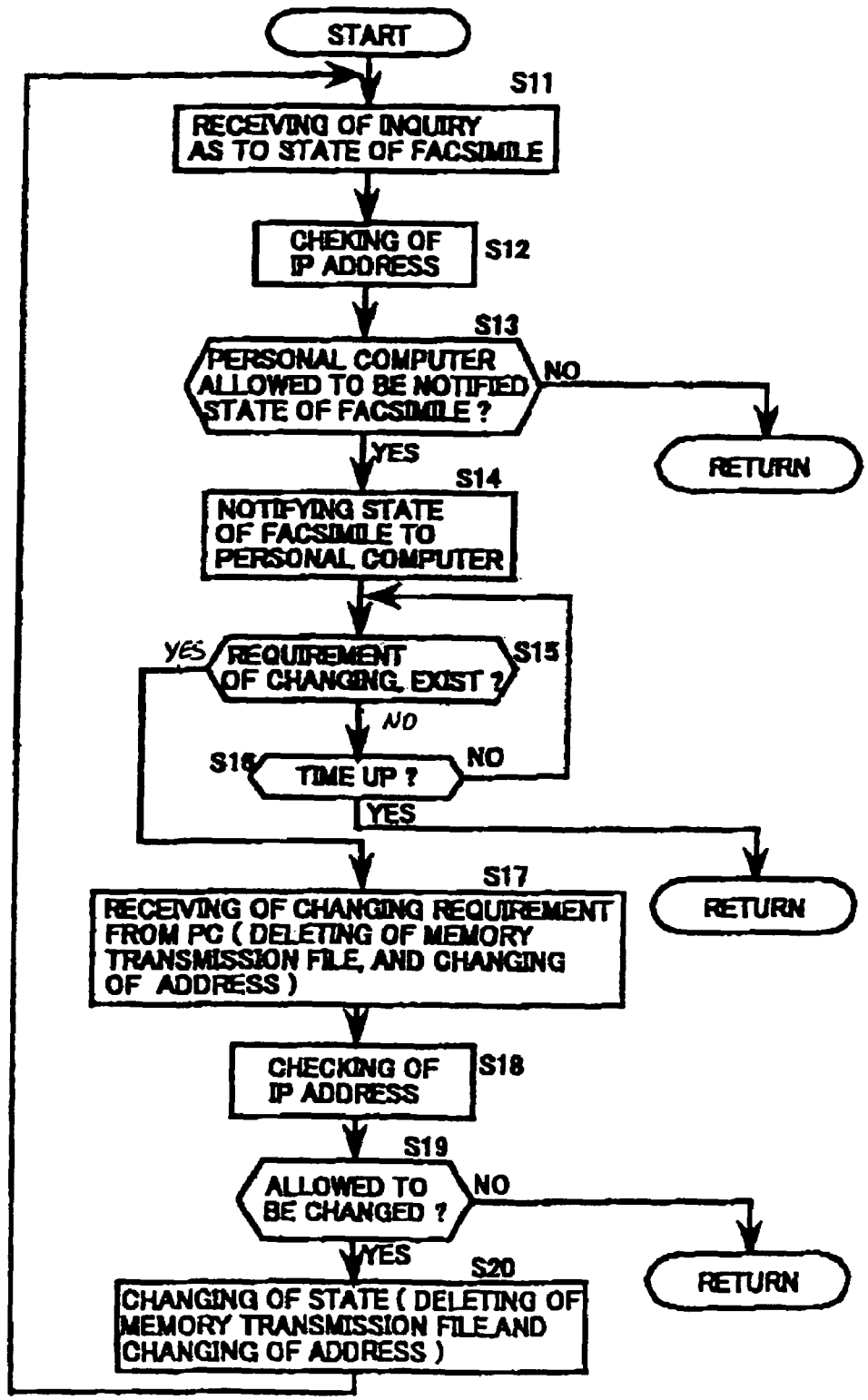
FIG. 9 is a flow-chart illustrating the operation of the facsimile terminal.

Furthermore, the monitoring system of the facsimile device is described hereinafter, referring to FIG. 9. In the facsimile device 200, as illustrated in the flowchart of FIG. 9, the CPU 206 accepts an inquiry in connection with the state of the memory transmission sent by one of the PCs 220, 230, 240, and 250 (step S11). Thereafter, it is determined whether the IP address on the network which is sent with the inquiry is set as a communication partner for informing the IP address storing section 203 of the memory transmission state (step S12).

When the IP address of the inquiring PC is not set as a communication partner, the process is completed (No, Step S13). However, if it can be confirmed that the PC is one which is set as a communication partner, by comparing the IP address of the inquiring PC with the IP addresses stored in storing section 203, and can receive information indicating the state of the memory transmission (Yes, Step S13), a change in the state of facsimile transmission from a previous inquiry is sent back to the PC. For example, if a memory transmission has not been performed since the last inquiry, this information is transmitted back to the PC. On the other hand, when a memory transmission has been performed since the last inquiry, the communication result (completion of the communication, or occurrence of a error) and the contents of the communication (address, transmission property, transmission time, etc.) are sent back to the PC which made the inquiry of the memory transmission state, in order to inform the PC of the state (Step S14).

Next, when there exists no requests from a PC within a preset time period, the process is completed (No, Step S15, Yes, Step S16). However, when there arises a request of changing the contents of the memory transmission file (Yes, Step S15), the request to change the content of the memory transmission file is accepted (Step S17). Then, the IP address transmitted at the same time as the request is checked to determine whether the communication partner (PC) making the request can modify the contents of the memory transmission file, by comparing the IP address to the IP address stored in the IP address storing section 203 (Step S18).

When the change of the memory transmission contents is not allowed, the process is completed (No, Step S19). However, when it can be confirmed that the PC is a communication partner allowed to change the contents of the memory transmission file (Yes, Step S19), the following operations are performed. In the case of a request from a PC for canceling the transmission file in response to an error occurrence, for example, the memory transmission file is erased (deleted) and the memory transmission is stopped. Furthermore, in the case of a request to send the memory transmission file once again, image memory transmission control is repeated a predetermined number of times. On the other hand, when the contents of the memory transmission file are changed by the PC, the memory transmission control is continued using the changes, in the same way that they would be performed if the changes were input from the operating section 201 of the facsimile itself. That is, transmission is performed in accordance with the input changes which can change the address of the file (facsimile number), the transmission property such as the transmission mode G3/G4 and the circuit used (Step S20). Thereafter, the process returns to step S11 and the facsimile communication control is continued, and the operation of responding to inquires from the PCs 220, 230, 240, and 250 is also continued.

As mentioned heretofore, in the third embodiment of the invention, even when the facsimile device 200 is commonly used by connecting the device to the LAN together with the PCs 220, 230, 240, and 250, it is possible to obtain the same benefits as the above-mentioned embodiments.

As is apparent from the foregoing description, according to the present invention, even the result of a communication requested at a location other than at the external terminal (PC) can be displayed and outputted at the external terminal, and confirmed (monitored). In particular, a completion message of the memory-transmitted communication result or an alarm message (memory transmission error) can be easily known.

Consequently, even the result of a memory transmission other than that of the memory transmission requested by the external terminal (PC) itself can be confirmed and treated, without wastefully recording and outputting a report of the transmission results for the facsimile device having to obtain the report of the results by going to the place where the facsimile device is installed and operating the facsimile device there.

Furthermore, it is possible to designate and treat the transmission file in the facsimile device from the external terminal. For instance, when an inputting mistake occurs in the facsimile number (address) of the communication partner, the transmission file in which the transmission error occurs can be deleted, and thereby the memory transmission can be instantly stopped and re-calling can be avoided. In addition, the address of the communication partner and the transmission property such as the transmission mode G3/G4 corresponding to the communication partner can be changed, and thereby time consumed by repeatedly performing the memory transmission can be saved considerably.

As the result, it is possible to monitor and operate the facsimile device from the external terminal and practically use the facsimile system comfortably.

As is apparent from the foregoing description, the present invention can achieve the advantageous superior functional effects as mentioned hereinafter.

According to the first aspect of the present invention, since the result of the memory transmission can be confirmed on the personal computer, it is not necessary to operate the facsimile device in order to confirm the result of the memory transmission. Furthermore, it is possible to eliminate the wasteful time and expense of outputting a memory transmission result report.

According to the second aspect of the present invention, the occurrence of an error in transmission can be confirmed on the personal computer during the time period of transmission. When the reason for the error is the wrong inputting of the facsimile number of the communication partner, it is possible to immediately stop the facsimile transmission when it is desired and to prevent the calling operation from being performed again.

Furthermore, according to the third aspect of the present invention, the occurrence of an error in transmission can be confirmed on the personal computer during the time period of transmission. When the reason for the error is the wrong inputting of the facsimile number of the communication partner, it is possible to immediately change the facsimile number. Therefore, it possible to eliminate the wasteful time and expense of performing the transmission over and over again.

Embodiments of the present invention have been described heretofore. However, other numerous embodiments or numerous modifications or variations of the invention are possible in light of the above teachings. It is therefore to be understood that, within the scope of the appended claims, the invention may be practiced otherwise than as specifically described herein.

Having now fully described the invention, it will be apparent to one of ordinary skill in the art that many changes and modifications can be made thereto without departing from the spirit and scope of the invention as set forth herein. This application is based on Japanese Patent Application No. JPAP10-333,292, filed on Nov. 24, 1998, and Japanese Patent Application No. JPAP11-190,752, filed on Jul. 5, 1999 the entire contents of which are herein incorporated by reference.

What is claimed is:

1. A facsimile monitoring system in a facsimile device, said facsimile monitoring system comprising:
    an address storing section registering network device addresses of a plurality of terminal devices authorized to monitor said facsimile device; and
    a network interface control section configured to control communication by said facsimile device through a network with a personal computer,
    wherein said network interface control section, in response to a request from said personal computer to access said facsimile device, compares a network device address of said personal computer with said network device addresses registered in said address storing section, and if said network device address of said personal computer matches one of the registered network device addresses, said personal computer is permitted to obtain information from said facsimile device regarding a memory transmission by the facsimile device immediately thereafter.

2. A facsimile monitoring system in a facsimile device, said facsimile monitoring system comprising:
    an address storing section registering network device addresses of a plurality of terminal devices authorized to monitor said facsimile device; and
    a network interface control section configured to control communication by said facsimile device through a network with a personal computer,
    wherein said network interface control section, in response to a request from said personal computer to access said facsimile device, compares a network device address of said personal computer with said network device addresses registered in said address storing section, and if said network device address of said personal computer matches one of the registered network device addresses, said personal computer is permitted to obtain information from said facsimile device regarding a communication error in a facsimile transmission by the facsimile device immediately thereafter.

3. A facsimile monitoring system in a facsimile device, said facsimile monitoring system comprising:
    an address storing section registering network device addresses of a plurality of terminal devices authorized to monitor said facsimile device; and
    a network interface control section configured to control communication by said facsimile device through a network with a personal computer,
    wherein said network interface control section, in response to a request from said personal computer to access said facsimile device, compares a network device address of said personal computer with said network device addresses registered in said address storing section, and if said network device address of said personal computer matches one of the registered network device addresses, when there exists a file in said facsimile device indicating a communication error, said personal computer is permitted to delete said file.

4. A facsimile monitoring system comprising:
    an address storing section registering network device addresses of a plurality of terminal devices authorized to monitor said facsimile device; and
    a network interface control section configured to control communication by said facsimile device through a network with a personal computer,
    wherein said network interface control section, in response to a request from said personal computer to access said facsimile device, compares a network device address of said personal computer with said network device addresses registered in said address storing section, and if said network device address of said personal computer matches one of the registered network device addresses, when there exists a file in said facsimile device indicating a communication error, said personal computer is permitted to change an address of said communication error file and a transmission property thereof.

5. A facsimile monitoring system comprising:
    an address storing section registering network device addresses of a plurality of terminal devices authorized to monitor said facsimile device; and
    a network interface control section configured to control communication by said facsimile device through a network with a personal computer,
    wherein said network interface control section, in response to a request from said personal computer to access said facsimile device, compares a network device address of said personal computer with said network device addresses registered in said address storing section, and if said network device address of said personal computer matches one of the registered network device addresses, when there exists a file in said facsimile device indicating a communication error, said personal computer is permitted to change at least one of an address of said communication error file and a transmission property thereof.

6. A method for allowing a facsimile device to be monitored from a personal computer, said method comprising the steps of:
    (a) registering addresses of a plurality of terminal devices authorized to monitor said facsimile device;
    (b) receiving a request from said personal computer to access said facsimile device;
    (c) comparing a network device address of said personal computer with said network device addresses registered in step (b); and
    (d) if said network device address of said personal computer matches one of the registered network device addresses, permitting said personal computer to obtain information from said facsimile device regarding a memory transmission by the facsimile device, immediately after the memory transmission is completed.

7. A method for allowing a facsimile device to be monitored from a personal computer, said method comprising the steps of:
    (a) registering addresses of a plurality of terminal devices authorized to monitor said facsimile device;
    (b) receiving a request from said personal computer to access said facsimile device;
    (c) comparing a network device address of said personal computer with said network device addresses registered in step (b); and (d) if said network device address of said personal computer matches one of the registered network device addresses, permitting said personal computer to obtain information from said facsimile device regarding a communication error in a facsimile transmission, immediately after the communication error occurs.

8. A method for allowing a facsimile device to be monitored from a personal computer, said method comprising the steps of:
(a) registering addresses of a plurality of terminal devices authorized to monitor said facsimile device;
(b) receiving a request from said personal computer to access said facsimile device;
(c) comparing a network device address of said personal computer with said network device addresses registered in step (b); and
(d) if said network device address of said personal computer matches one of the registered network device addresses, permitting said personal computer to delete a file, stored in said facsimile device, indicating a communication error in said facsimile device.

9. A method for allowing a facsimile device to be monitored from a personal computer, said method comprising the steps of:
(a) registering addresses of a plurality of terminal devices authorized to monitor said facsimile device;
(b) receiving a request from said personal computer to access said facsimile device;
(c) comparing a network device address of said personal computer with said network device addresses registered in step (b); and
(d) if said network device address of said personal computer matches one of the registered network device addresses, permitting said personal computer to change an address in a communication error file and a transmission property thereof.

10. A method for allowing a facsimile device to be monitored from a personal computer, said method comprising the steps of:
(a) registering addresses of a plurality of terminal devices authorized to monitor said facsimile device;
(b) receiving a request from said personal computer to access said facsimile device;
(c) comparing a network device address of said personal computer with said network device addresses registered in step (b); and
(d) if said network device address of said personal computer matches one of the registered network device addresses permitting said personal computer to change at least one of an address in a communication error file and a transmission property thereof.

11. A facsimile device monitoring system for monitoring a communication result of a facsimile device from an external terminal, comprising:
a facsimile device provided with
an address storing section registering network device addresses of a plurality of terminal devices authorized to monitor said facsimile device,
a network interface control section configured to control communication by said external terminal through a network with a personal computer said network interface control section, in response to a request from said external terminal to access said facsimile device, comparing a network device address of said external terminal with said network device addresses registered in said address storing section, and
a result sending-out medium sending out a communication result to said external terminal if said network device address of said external terminal matches one of the registered network device addresses;
said external terminal being provided with a display medium displaying and outputting the communication result sent from said facsimile device, and
a result monitoring medium executing an operation of sending out a result of the communication performed by said facsimile device to said external terminal periodically or per each communication.

12. The facsimile device monitoring system as defined in claim 11,
wherein said result monitoring medium monitors a state of a memory transmission file of said facsimile device, and
wherein said result monitoring medium sends out a completion result or an error result of the memory transmission to said external terminal, and
wherein said external terminal outputs a completion message or an alarm message as a completion result or an error result.

13. The facsimile device monitoring system as defined in claim 11,
wherein said external terminal is provided with an indication medium for designating a transmission file to be held in memory of said facsimile device and for indicating treatment of said transmission file, and further comprising:
a file treatment medium for treating the file in the memory of said facsimile device on a basis of the indication from said indication medium.

14. The facsimile device monitoring system as defined in claim 12,
wherein said external terminal is provided with an indication medium designating the transmission file to be held in a memory of said facsimile device and indicating a treatment of said transmission file, and further comprising:
a file treatment medium for treating the file in the memory of said facsimile device on the basis of the indication from said indication medium.

15. The facsimile device monitoring system as defined in claim 13,
wherein said file treatment medium deletes a transmission error file designated on a basis of the indication transmitted by said indication medium, from the memory of said facsimile device.

16. The facsimile device monitoring system as defined in claim 14,
wherein said file treatment medium deletes a transmission error file designated on a basis of the indication transmitted by said indication medium from the memory of said facsimile device.

17. The facsimile device monitoring system as defined in claim 14,
wherein said medium changes one or more of an address of the designated transmission error file and a transmission property.

18. The facsimile device monitoring system as defined in claim 14, wherein said file treatment medium changes one or more of an address of the designated transmission error file and a transmission property.

19. The facsimile device monitoring system as defined in claim 1, wherein if said network device address of said personal computer marches one of the registered network device addresses, a message of a completion of a specific facsimile transmission is displayed on a displaying panel of said personal computer immediately thereafter.

20. The facsimile device monitoring system as defined in claim 1, wherein if said network device address of said personal computer matches one of the registered network device addresses, and there exists a communication error in said memory transmission, a message of an alarm is displayed on a displaying panel of said personal computer immediately thereafter.

* * * * *